United States Patent
Miller et al.

(10) Patent No.: US 10,482,687 B2
(45) Date of Patent: Nov. 19, 2019

(54) DIAGNOSIS OF AN ACOUSTIC VEHICLE ALERTING SYSTEM (AVAS) BASED ON EXISTING SENSORS

(71) Applicant: Ford Global Technologies, LLC, Dearborn, MI (US)

(72) Inventors: Kenneth James Miller, Canton, MI (US); Aed M. Dudar, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/485,172

(22) Filed: Apr. 11, 2017

(65) Prior Publication Data

US 2018/0293812 A1   Oct. 11, 2018

(51) Int. Cl.
| | |
|---|---|
| *B60Q 5/00* | (2006.01) |
| *G07C 5/00* | (2006.01) |
| *G07C 5/08* | (2006.01) |
| *H04R 29/00* | (2006.01) |

(52) U.S. Cl.
CPC .............. *G07C 5/08* (2013.01); *B60Q 5/008* (2013.01); *G07C 5/008* (2013.01); *H04R 29/001* (2013.01); *H04R 29/002* (2013.01); *H04R 2499/13* (2013.01)

(58) Field of Classification Search
CPC ........ G07C 5/08; G07C 5/008; H04R 29/002; H04R 2499/13; B60Q 5/008
See application file for complete search history.

(56) References Cited

U.S. PATENT DOCUMENTS

| | | | |
|---|---|---|---|
| 5,635,903 | A | 6/1997 | Koike et al. |
| 7,979,147 | B1 | 7/2011 | Dunn |
| 8,018,328 | B2 | 9/2011 | Goldstein et al. |
| 8,204,243 | B2 | 6/2012 | Smith |
| 8,537,030 | B2 | 9/2013 | Perkins |

(Continued)

FOREIGN PATENT DOCUMENTS

| | | |
|---|---|---|
| EP | 3174046 A1 | 5/2017 |
| GB | 2558074 A | 7/2018 |

(Continued)

OTHER PUBLICATIONS

Fortina et al, Acoustic Vehicle Alerting Systems (AVAS)—Regulations, Realization and Sound Design Challenges, Jun. 2016 (Year: 2016).*

(Continued)

*Primary Examiner* — Alan D Hutchinson
(74) *Attorney, Agent, or Firm* — Frank Lollo; Eversheds Sutherland (US) LLP

(57) ABSTRACT

Method and apparatus are disclosed for an acoustic vehicle altering system (AVAS) based on existing sensors. An example vehicle includes speakers, sensors, and an acoustic vehicle alerting system. The speakers are positioned to play sound to an area external to the vehicle. The sensor is not part of an acoustic vehicle alerting system. Additionally, the acoustic vehicle alerting system plays a test frequency on the speakers, evaluates feedback from the sensor to determine whether there is an error in the acoustic vehicle alerting system, and when there is an error, displays an alert.

14 Claims, 6 Drawing Sheets

(56) References Cited

U.S. PATENT DOCUMENTS

| | | | |
|---|---|---|---|
| 8,860,585 B2 * | 10/2014 | Tsuzuki | G08G 1/166 340/425.5 |
| 2013/0114827 A1 * | 5/2013 | Lee | B60Q 5/008 381/86 |
| 2015/0049877 A1 | 2/2015 | Horie | |
| 2015/0151680 A1 * | 6/2015 | Park | B60Q 5/008 381/86 |
| 2015/0177363 A1 * | 6/2015 | Hermann | G01S 5/20 367/118 |
| 2016/0152183 A1 * | 6/2016 | Kim | B60Q 11/00 381/58 |
| 2017/0222612 A1 * | 8/2017 | Zollner | G08G 1/167 |

FOREIGN PATENT DOCUMENTS

| | | |
|---|---|---|
| JP | 2012240503 A | 12/2012 |
| WO | WO 2012059285 A1 | 5/2012 |
| WO | WO 2013/145083 A1 | 10/2013 |

OTHER PUBLICATIONS

U.S. Department of Transportation's Core Jun. 2011 System Requirements Specification (SyRS), accessed at http://www.its.dot.gov/meetings/pdf/CoreSystem_SE_SyRS_RevA%20(2011-06-13).pdf.
Search Report dated Sep. 18, 2018 for Great Britain Patent Application No. 1805888.3 (5 Pages).

* cited by examiner

DIAGNOSIS OF AN ACOUSTIC VEHICLE ALERTING SYSTEM (AVAS) BASED ON EXISTING SENSORS

TECHNICAL FIELD

The present disclosure generally relates to electric and hybrid vehicles and, more specifically, diagnosis of an acoustic vehicle altering system (AVAS) based on existing sensors.

BACKGROUND

As required by the Pedestrian Safety Enhancement Act of 2010 (PSEA), the U.S. Department of Transportation's National Highway Traffic Safety Administration (NHTSA) is proposing that hybrid and electric vehicles meet minimum sound standards in order to help make all pedestrians more aware of the approaching vehicles. The standard, Federal Motor Vehicle Safety Standard number 141 (FMVSS141), establishes criteria for an alert sound that is recognizable as a motor vehicle in operation. This facilitates blind and other pedestrians to reasonably detect a nearby hybrid or electric vehicle operating below 30 kilometers per hour (km/h) (18 mph), when the vehicle is in motion, stationary, and when the vehicle is operating in reverse. The acoustic vehicle alerting system (AVAS) will be required to enable pedestrians to discern the sound of a vehicle (e.g., the vehicle's presence, direction, location, and operation).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for an acoustic vehicle altering system (AVAS), where the AVAS diagnostic module utilizes other available sensors. An example vehicle includes speakers, sensors, and an acoustic vehicle alerting system. The speakers are positioned to play sound to an area external to the vehicle. The sensor is not part of an acoustic vehicle alerting system. Additionally, the acoustic vehicle alerting system plays a test frequency on the speakers, evaluates feedback from the sensor to determine whether there is an error in the acoustic vehicle alerting system, and when there is an error, displays an alert.

Another example vehicle includes speakers positioned to play sound to an area external to the vehicle. Additionally, the example vehicle includes a dedicated short range communication module to communicate with an external object that has a microphone. The vehicle includes an acoustic vehicle alerting system that plays a test frequency on the speakers, evaluates feedback from the external object to determine whether there is an error in the acoustic vehicle alerting system, and when there is an error, increase a volume of sound played by the speakers.

An example vehicle includes speakers, sensors, a dedicated short range communication module, and an acoustic vehicle alerting system. The speakers are positioned to play sound to an area external to the vehicle. The sensors are not part of the acoustic vehicle alerting system. The dedicated short range communication module communicates with an external object that has a microphone. The acoustic vehicle alerting system plays a test frequency on the speakers, receives feedback from the sensors and the external object, determines there is an error in the acoustic vehicle alerting system based on a majority of the feedback indicating that there is an error, and when there is an error, activates a diagnostic light.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
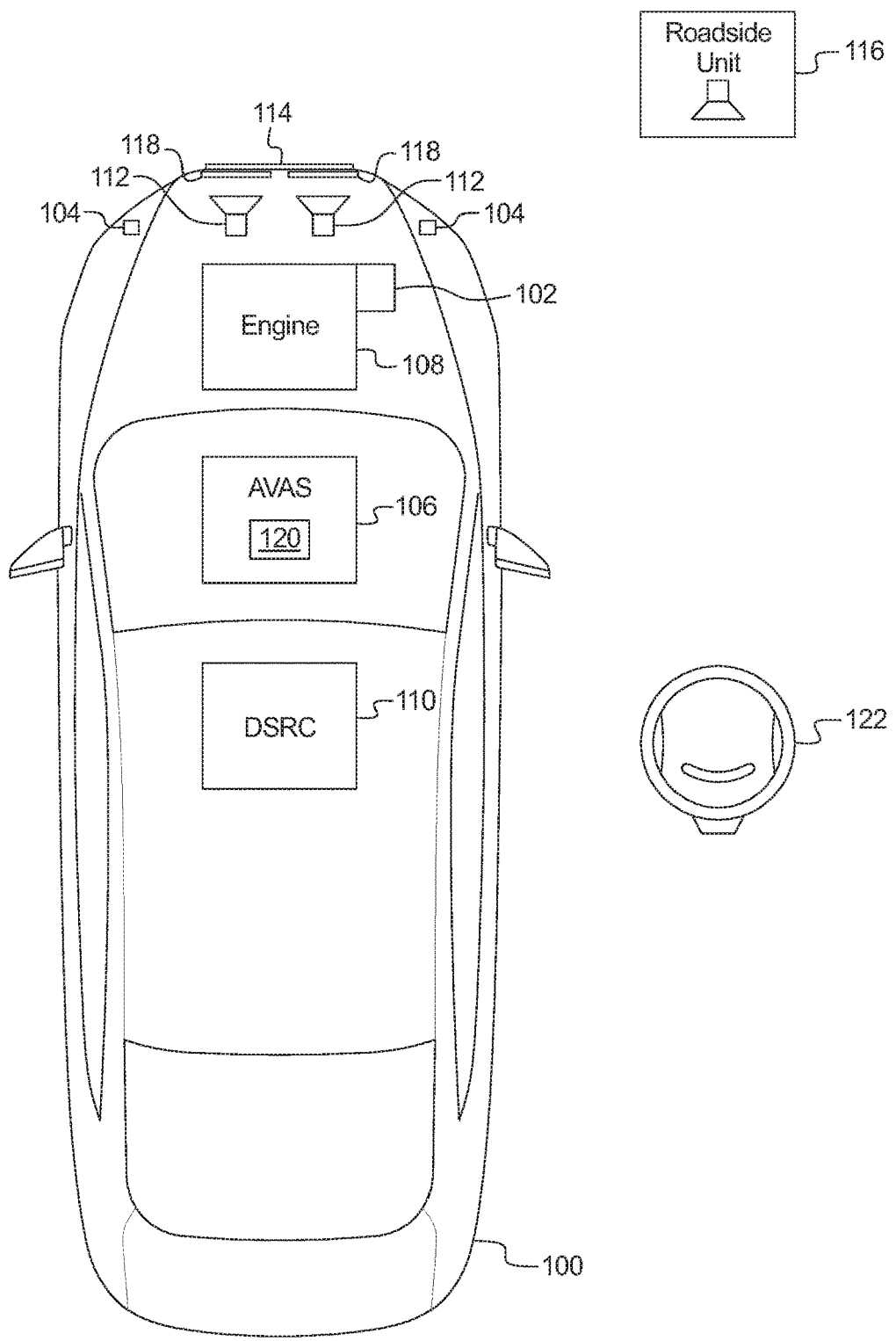
FIG. 1 illustrates a vehicle with sensors to diagnose an acoustic vehicle altering system in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Standard vehicles (e.g., gasoline and diesel fuel based vehicles) generate noise as part of the operation of the engine. In some circumstances, this noise is undesirable (e.g., noise that enters the cabin of the vehicle, noise pollution, etc.). However, in other situations, the noise is desirable. For example, pedestrians use the noise to orient themselves with respect to the location and direction of travel of the vehicle. Electric vehicles and hybrid vehicles in electric drive mode do not produce the noise to facilitate pedestrians orientating themselves. As a result, pedestrians may unknowingly make dangerous decisions with regards to the silent vehicle. For example, they may not realize that the vehicle is backing up as they pass it in a parking lot.

As a result, electric and hybrid vehicles are being equipped with acoustic vehicle alerting systems (AVAS). The AVAS generate sounds designed to inform pedestrians of the location and the direction of travel of the vehicle via speakers positioned direct the sounds external to the vehicle. However, when a safety system is added to the vehicle, a method to monitor and diagnose the system is required. Because of noise reduction and cancelling techniques used in the cabin of the vehicle, the passengers inside the vehicle may not be able to determine when the AVAS is not properly functioning. Adding microphones to capture and diagnose the audio created by the AVAS increases vehicle cost and complexity, and requires additional controls to determine if the microphones are also functioning correctly.

As disclosed below, the AVAS uses one or more existing sensors to determine whether the AVAS is generating the sound. These existing sensors are not installed with consideration to the vehicle having the AVAS. In some examples, these sensors are internal to the vehicle. Alternatively or additionally, in some examples, these sensors are external to the vehicle. Additionally, in some examples, the AVAS uses multiple sensors when available to determines whether it is functioning properly. In a first scenario, the AVAS, from time to time (e.g., once per drive cycle, once weekly, etc.), performs a test sequence and analyzes data received from an engine knock sensor to determine whether the AVAS is function properly. In a second scenario, the AVAS, from time to time (e.g., on start up, once weekly, etc.), performs a test sequence and analyzes data received from an ultrasonic sensor to determine whether the AVAS is function properly. In a third scenario, the AVAS performs a test sequence and analyzes data received from a roadside unit with a microphone via vehicle-to-vehicle communication (e.g., dedicated short range communication (DSRC), or other method of wireless data communication) to determine whether the AVAS is function properly. In a forth scenario, the AVAS performs a test sequence and analyzes data received from an external robot or drone with a microphone to determine whether the AVAS is function properly.

FIG. 1 illustrates a vehicle 100 with sensors 102 and 104 to diagnose an acoustic vehicle alerting system (AVAS) 106 in accordance with the teachings of this disclosure. The vehicle 100 may be a hybrid vehicle, an electric vehicle, or a fuel cell vehicle. The vehicle 100 includes parts related to mobility, such as a powertrain with a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes an engine knock sensor 102 (when the vehicle 100 is a hybrid vehicle), ultrasonic sensors 104, the AVAS 106, an engine 108 (when the vehicle 100 is a hybrid vehicle), a dedicated short range communication (DSRC) module 110, external-facing speakers 112 coupled to the AVAS 106, and a grille assembly 114.

The engine knock sensor 102 is screwed to the engine block or manifold of the engine 108. The engine knock sensor 102 detects vibrations of the engine 108 to detect vibrations caused by engine knocking. Signals from the engine knock sensor 102 are used to adjust detonation timing within the cylinders. In some examples, when the vehicle 100 is not in motion and the engine 108 is off, the engine knock sensor 102 is used to detect vibrations of the engine 108 caused by the acoustic energy generated by the AVAS 106.

The ultrasonic sensors 104 are used to detect objects in the vicinity of the vehicle 100. The ultrasonic sensors 104 include a speaker to transmit a high-frequency pulse and a microphone to detect the reflected high-frequency pulse. The ultrasonic sensors 104 determine the distance of an object based on the time between transmitting the high-frequency pulse and receiving the reflection. Normally, the ultrasonic sensors 104 detect ultrasonic frequencies. In some examples, when the vehicle 100 is not in motion and the engine 108 is off, the filters of the ultrasonic sensors 104 are configured to detect target frequencies to detect the acoustic energy generated by the AVAS 106.

The AVAS 106 generates sound when the vehicle 100 is either (a) traveling below a speed (e.g. 30 kilometers per hour (km/h) (18 mph)) at which encountering pedestrian traffic is likely or (b) is traveling in reverse. The AVAS 106 generates sound that facilitates pedestrians locating and determining the direction of travel of the vehicle 100. For example, the AVAS 106 may generate one sound when moving forward, and a different sound when moving in reverse. As another example, the AVAS 106 may augment the generated sounds based on the speed of the vehicle 100. In some examples, the sound is a multi-tonal hum with a pitch based on the speed of the vehicle 100.

The DSRC module 110 include antenna(s), radio(s) and software to broadcast messages and to establish connections between the vehicles 100, infrastructure-based modules (e.g., roadside units 116, etc.), and mobile device-based modules (not shown). More information on the DSRC network and how the network may communicate with vehicle hardware and software is available in the U.S. Department of Transportation's Core June 2011 System Requirements Specification (SyRS) report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Alternatively, in some examples, the DSRC module 110 is a different wireless module that includes also includes hardware (e.g., processors, memory, storage, antenna, etc.) and software to control the wireless network interfaces. For example, the wireless module may include one or more communication controllers for standards-based networks (e.g., local area wireless networks (including IEEE 802.11 a/b/g/n/ac or others), personal area networks (Bluetooth®, Bluetooth® Low Energy, Zigbee®, Z-Wave®, etc.), etc.).

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The speakers 112 are externally-facing to generate sound to the external area around the vehicle 100. The speakers 112 may be positioned in any suitable location. In the illustrated example, the speakers are positioned behind the grille assembly 114 at the front of the vehicle 100. In some examples, the grille assembly 114 protects the speakers 112. The grille assembly 114 includes a screen (sometimes referred to as a "fresh air opening") that facilitates sound generated by the speakers 112 to reach the external area around the vehicle 100. In some examples, the grille assembly 114 includes shutters 118 connected to motors (not shown) configured to shut blocking the screen. The closed shutters 118 create a sound wall so that the sound generated by the speakers 112 reverberates and remains within the engine compartment of the vehicle 100.

The AVAS 106 includes a diagnostic module 120. The diagnostic module 120 determines whether the AVAS 106 is functioning properly. When the AVAS 106 is not functioning properly, the diagnostic module 120 causes an alert to be displayed on a center console or dashboard display of the vehicle 100 and/or takes remedial action. In some examples, the diagnostic module 120 increases the volume of the sound generated by the speakers 112 to compensate for when the error is caused by lower than expected speaker value due to wear and/or damage to the speakers 112. The diagnostic module 120 diagnosis the AVAS 106 by (a) detecting vibrations by the engine knock sensor 102, (b) by detecting sound via the ultrasonic sensors 104, (c) communicating with a roadside units 116 via the DSRC module 110, and/or (d) communicating with a robot or drone 122 (sometimes referred to as an "unmanned ground vehicle (UGV)" or an "unmanned aerial vehicle (UAV)") via the DSRC module 110.

To detect vibrations by the engine knock sensor 102, the diagnostic module 120 waits until the vehicle 100 is not in motion and the engine 108 is off. The diagnostic module 120 detects and evaluates changes in the sound frequency and magnitude by using the noise vibration sensing capabilities of the engine knock sensor 102. In some examples, the diagnostic module 120 closes the shutters 118 of the grille assembly 114 to create a sound wall to increase the magnitude of sound that is bounced back toward the engine knock sensor 102. The diagnostic module 120 causes the speakers 112 to play a sound at a target frequency. In some examples, the sound selected by the diagnostic module 120 is the natural frequency of the engine 108. The diagnostic module 120 monitors the vibration signal from the engine knock sensor 102 to detect a response that satisfies (e.g., is greater than or equal to) a threshold. In some examples, when the response does not satisfy the threshold, the diagnostic module 120 increases the gain of the generated sound. In such example, the diagnostic module 120 repeats the diagnostic until either (a) the response satisfies the threshold or (b) the gain is at its maximum setting. When the increase in gain satisfies the threshold, then the increased gain value is saved in memory, and used by the AVAS 106 during normal operation. Alternatively, in some examples, when the response does not satisfy the threshold, the diagnostic module 120 activates a warning on the center console display and/or the dashboard display of the vehicle 100.

To detect the sounds via the ultrasonic sensors 104, the diagnostic module 120 waits until the vehicle 100 is not in motion and the engine 108 is off. The diagnostic module 120 detects and evaluates changes in the sound frequency and magnitude by using the audio capabilities of the ultrasonic sensors 104. The diagnostic module 120 causes the speakers 112 to play a sound at a target frequency. The signal processing for the ultrasonic sensors 104 is modified to detect the target frequency instead of the ultrasonic frequencies. For example, the target frequency may be 1 kilohertz. The diagnostic module 120 compares the signal detected by the ultrasonic sensors 104 to a threshold. In some examples, when the response does not satisfy (e.g., is less than) the threshold, the diagnostic module 120 increases the gain of the generated sound. In such example, the diagnostic module 120 repeats the diagnostic until either (a) the response satisfies the threshold or (b) the gain is at its maximum setting. Alternatively, in some examples, when the response does not satisfy the threshold, the diagnostic module 120 activates a warning on the center console display and/or the dashboard display of the vehicle 100.

The roadside unit 116 of the illustrated example includes a DSRC module and a microphone. In some examples, the roadside unit 116 is incorporated into an electric vehicle charging station. Alternatively, the roadside unit 116 may be incorporated into other devices, such as security systems and/or weather stations. When the vehicle 100, via the DSRC module 110, detects the roadside unit 116, vehicle 100 is not in motion, and the engine 108 is off, the diagnostic module 120 establishes communication with the roadside unit 116. The diagnostic module 120 plays a range of sounds to be recorded by the microphone of the roadside unit 116. The roadside unit 116 sends the recorded sounds to the diagnostic module 120. The diagnostic module 120 receives the recording and compares it to an expected value taking in consideration the distance between the vehicle 100 and the roadside unit 116. In some examples, when the difference between the recording and the expected value does not satisfy (e.g., is less than) a threshold, the diagnostic module 120 increases the gain of the generated sound. In such example, the diagnostic module 120 repeats the diagnostic until either (a) the response satisfies the threshold or (b) the gain is at its maximum setting. Alternatively, in some examples, when the response does not satisfy the threshold, the diagnostic module 120 activates a warning on the center console display and/or the dashboard display of the vehicle 100.

The robot or drone 122 of the illustrated example includes a DSRC module and a microphone. The robot or drone 122 is autonomous. The robot or drone may be, for example, robotic sentry/patrols acting as security guards, or an information kiosk configured to help people navigate the area. When the vehicle 100, via the DSRC module 110, detects the robot or drone 122, the diagnostic module 120 establishes communication with the robot or drone 122. The diagnostic module 120 plays a range of sounds to be recorded by the microphone of the roadside unit 116. The diagnostic module 120 receives a message from the robot or drone 122 indicative of whether the robot or drone 122 received sound from the vehicle 100. If the message indicates that the robot or drone 122 did not receive the sound, the diagnostic module 120 increases the gain of the generated sound. In such example, the diagnostic module 120 repeats the diagnostic until either (a) the response satisfies the threshold or (b) the gain is at its maximum setting. Alternatively, in some examples, when the message indicates that the robot or drone 122 did not receive the sound, the diagnostic module 120 activates a warning on the center console display and/or the dashboard display of the vehicle 100.

In some examples, the diagnostic module 120 the thresholds and/or the expected values are preset when the vehicle is manufactured. Alternatively, in some examples, the diagnostic module 120 establishes baseline thresholds and/or the expected values based on multiple diagnostic measurements over time. For example, the diagnostic module 120 may take seven measurements over the course of seven days. The diagnostic module 120 statistically analyzes the multiple diagnostic measurements to determine average values and standard deviations. After establishing the baseline, the diagnostic module 120 determines that the AVAS 106 is not functioning properly when the measurement deviates from the average by more than a certain number (e.g., 2, 3, etc.) of standard deviations.

Figure 2:
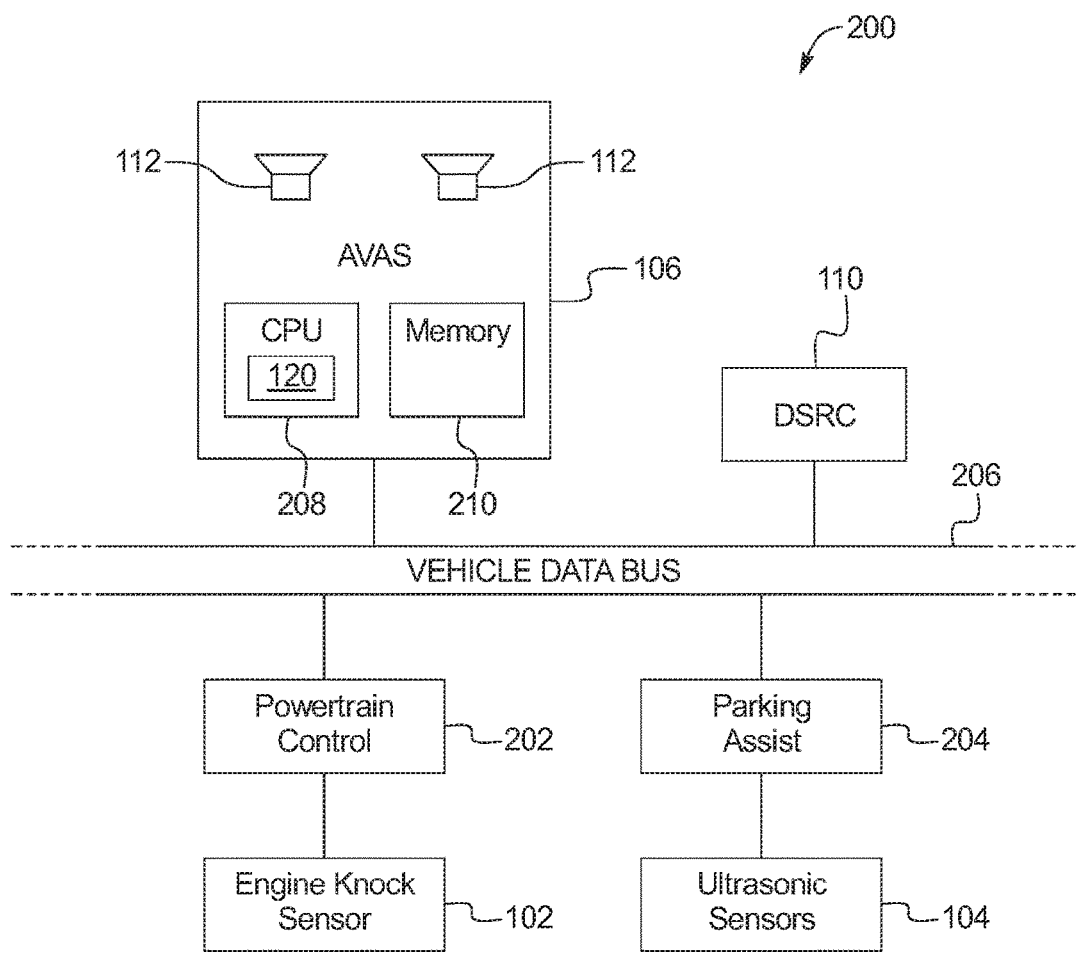
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the sensors 12 and 104, the AVAS 106, the DSRC module 110, the speakers 112, a power train control module 202, a parking assist unit 204, and a vehicle data bus 206.

The AVAS 106 includes a processor or controller 208 and memory 210. In the illustrated example, the AVAS 106 is structured to include diagnostic module 120. The processor or controller 208 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 210 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, etc.), unalterable memory (e.g., EPROMs), read-only memory, and/or high-capacity storage devices (e.g., hard drives, solid state drives, etc). In some examples, the memory 210 includes multiple kinds of memory, particularly volatile memory and non-volatile memory.

The memory 210 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 210, the computer readable medium, and/or within the processor 208 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

In a hybrid vehicle, the power train control module 202 includes hardware and firmware to control the ignition, fuel injection, emission systems, transmission and/or the brake system of the vehicle 100. The power train control module 202 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. In the illustrated example, power train control module 202 is communicatively coupled to the engine knock sensor 102.

The parking assist unit 204 includes hardware and firmware to control and process information (e.g., distance calculations, etc.) from the ultrasonic sensor 104. In the illustrated example, the parking assist unit 204 is communicatively coupled to the ultrasonic sensors 104.

The vehicle data bus 206 communicatively couples the AVAS 106, the DSRC module 110, the power train control module 202, and the parking assist unit 204. In some examples, the vehicle data bus 206 includes one or more data buses. The vehicle data bus 206 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
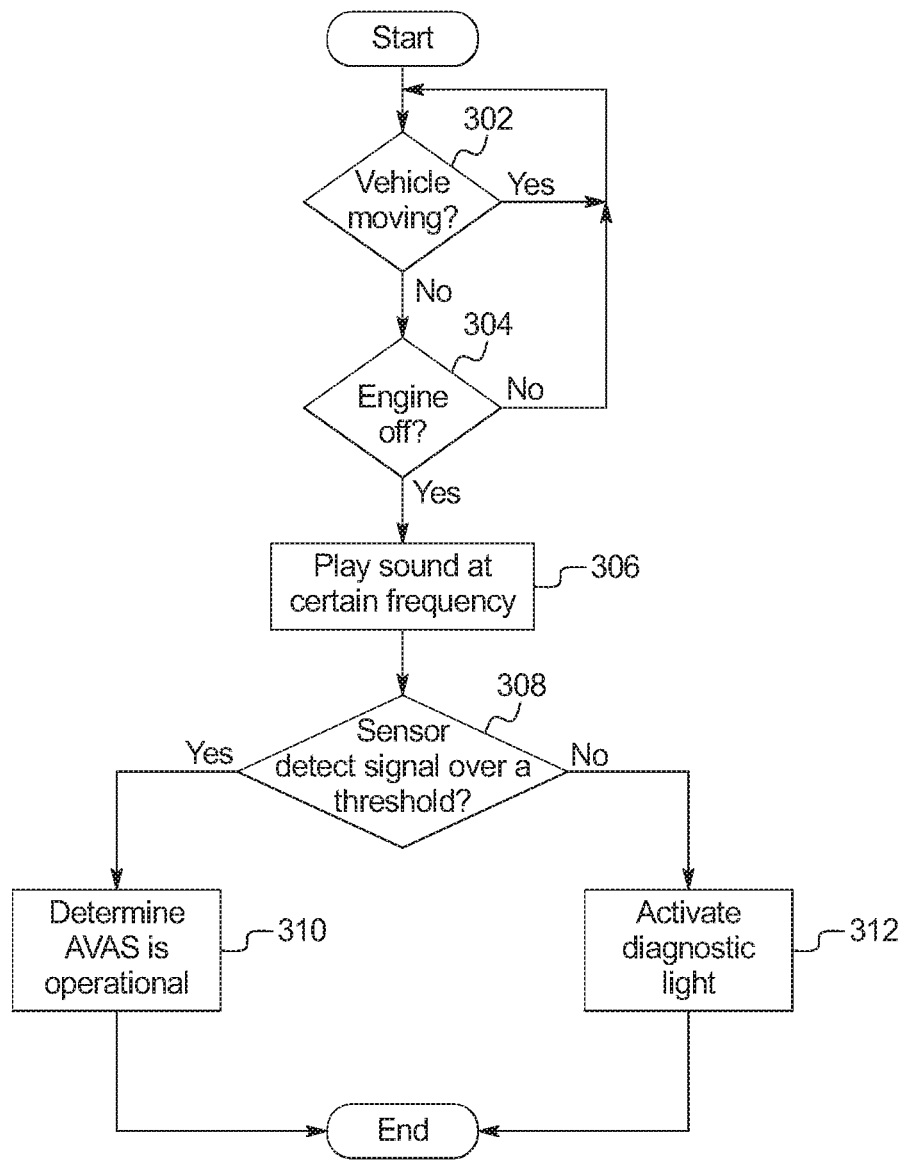
FIG. 3 is a flowchart of a method to diagnosis of the acoustic vehicle altering system of FIGS. 1 and 2 based on existing vehicle sensors, which may be implemented by the electronic components of FIG. 2.

FIG. 3 is a flowchart of a method to diagnosis of the AVAS 106 of FIGS. 1 and 2 based on vehicle sensors 102 and 104, which may be implemented by the electronic components 200 of FIG. 2. Initially, at block 302, the diagnostic module 120 waits until the vehicle 100 is not moving. In some examples, the diagnostic module 120 determines whether the vehicle 100 is moving based on information (e.g., vehicle speed, transmission setting, etc.) from the power train control module 202. At block 304, when the vehicle 100 is a hybrid vehicle, the diagnostic module 120 waits until the engine 108 is off. In some examples, the diagnostic module 120 receives or otherwise retrieves the state of the engine 108 from the power train control module 202.

At block 306, the diagnostic module 120 plays, via the speakers 112, a sound at a target frequency. At block 308, the diagnostic module 120 determines if the sensor 102 and 104 detect a signal that satisfies a threshold. When using the engine knock sensor 102, the diagnostic module 120 monitors the vibration signal from the engine knock sensor 102 to detect a response that satisfies (e.g., is greater than or equal to) the threshold. When using the ultrasonic sensors 104, the diagnostic module 120 compares the signal detected by the ultrasonic sensors 104 to the threshold. When the signal satisfies the threshold, the method continues at block 310. Otherwise, when the signal does not satisfy the threshold, the method continues at block 312. At block 310, the diagnostic module 120 determines that the AVAS 106 is functioning properly. At block 312, the diagnostic module 120 activates, via the center console display and/or the dashboard display, a diagnostic light.

Figure 4:
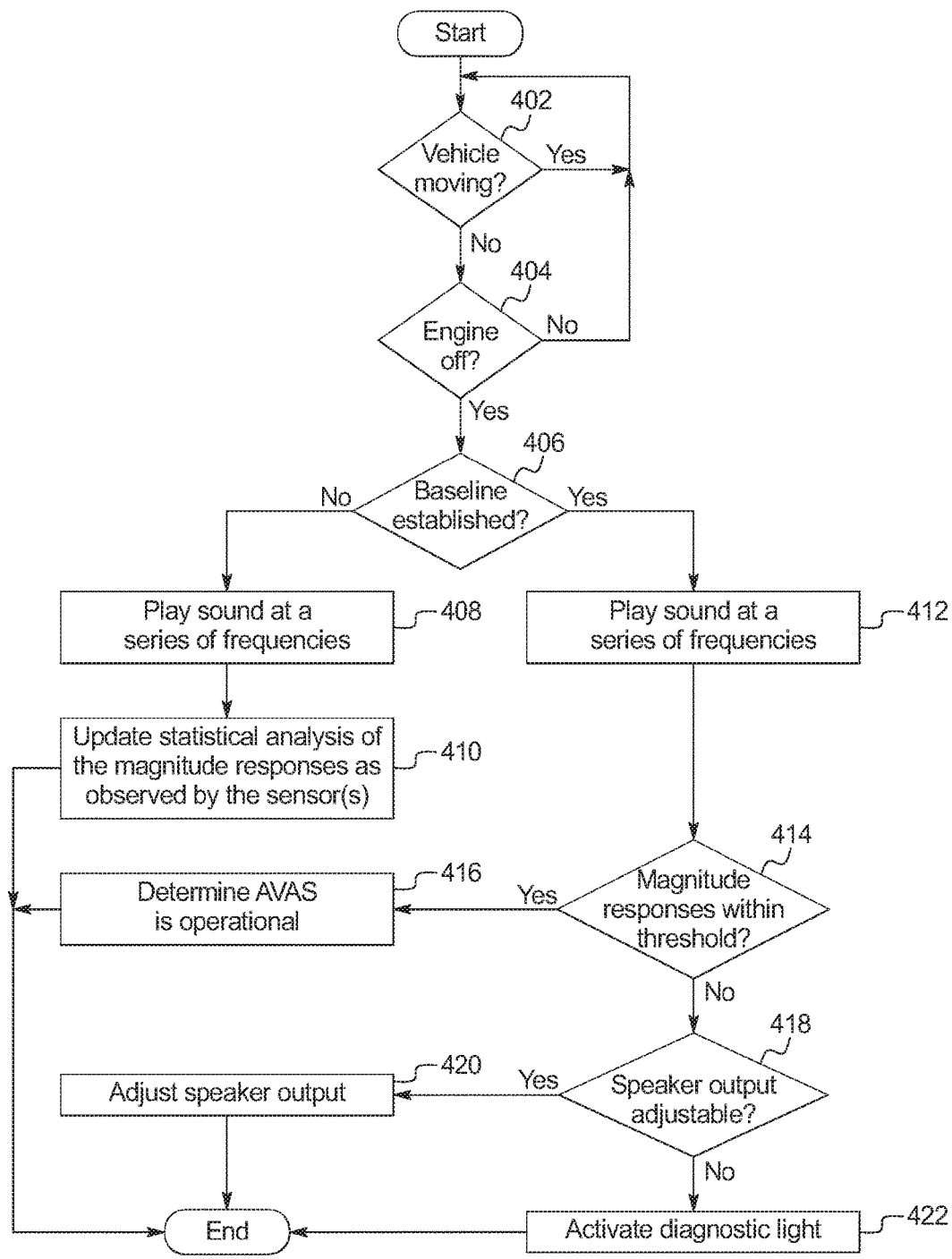
FIG. 4 is a flowchart of another method to diagnosis of the acoustic vehicle altering system of FIGS. 1 and 2 based on existing vehicle sensors, which may be implemented by the electronic components of FIG. 2.

FIG. 4 is a flowchart of another method to diagnosis of the AVAS 106 of FIGS. 1 and 2 based on existing vehicle sensors 102 and 104, which may be implemented by the electronic components 200 of FIG. 2. Initially, at block 402, the diagnostic module 120 waits until the vehicle 100 is not moving. In some examples, the diagnostic module 120 determines whether the vehicle 100 is moving based on information (e.g., vehicle speed, transmission setting, etc.) from the power train control module 202. At block 404, when the vehicle 100 is a hybrid vehicle, the diagnostic module 120 waits until the engine 108 is off. In some examples, the diagnostic module 120 receives or otherwise retrieves the state of the engine 108 from the power train control module 202.

At block 406, the diagnostic module 120 determines whether a baseline sensor response value has been determined and stored in memory (e.g., the memory 210 of FIG. 2 above). If a based line has not been established, the method continues to block 408. Otherwise, if the baseline has been established, the method continues to block 412.

At block 408, the diagnostic module 120 plays sound, via the speakers 112, at a series of frequencies. At block 410, the diagnostic module 120 measures the response on the sensor(s) 102 and 104 and updates a statistical analysis of the magnitude responses observed by the sensor(s) 102 and 104. The statistical analysis includes a mean value and a standard deviation. The baseline sensor response value is determines after a target number (e.g., five, ten, etc.) of samples have been observed.

At block 412, the diagnostic module 120 plays sound, via the speakers 112, at a series of frequencies. At block 414, the diagnostic module 120 determines with the magnitude responses observed by the sensor(s) 102 and 104 is within a threshold set by the baseline sensor response value. The threshold is based on the mean and the standard deviation calculated for the baseline sensor response value. In some examples, the threshold is three standard deviations from the mean. When the magnitude responses observed by the sensor(s) 102 and 104 is within the threshold, the method continues at block 416. Otherwise, when the magnitude responses observed by the sensor(s) 102 and 104 is not within the threshold, the method continues at block 418. At block 416, the diagnostic module 120 determines that the AVAS 106 is functioning properly.

At block 418, the diagnostic module 120 determines whether the output of the speakers 112 is adjustable. The output of the speakers 112 is adjustable when the signal driving the speakers 112 is not at its maximum gain. When the output of the speakers 112 is adjustable, the method continues at block 420. Otherwise, when the output of the speakers 112 is not adjustable, the method continues at block 422. At block 420, the diagnostic module 120 increases in gain of the signal driving the speakers 112. At block 422, the diagnostic module 120 activates, via the center console display and/or the dashboard display, a diagnostic light.

Figure 5:
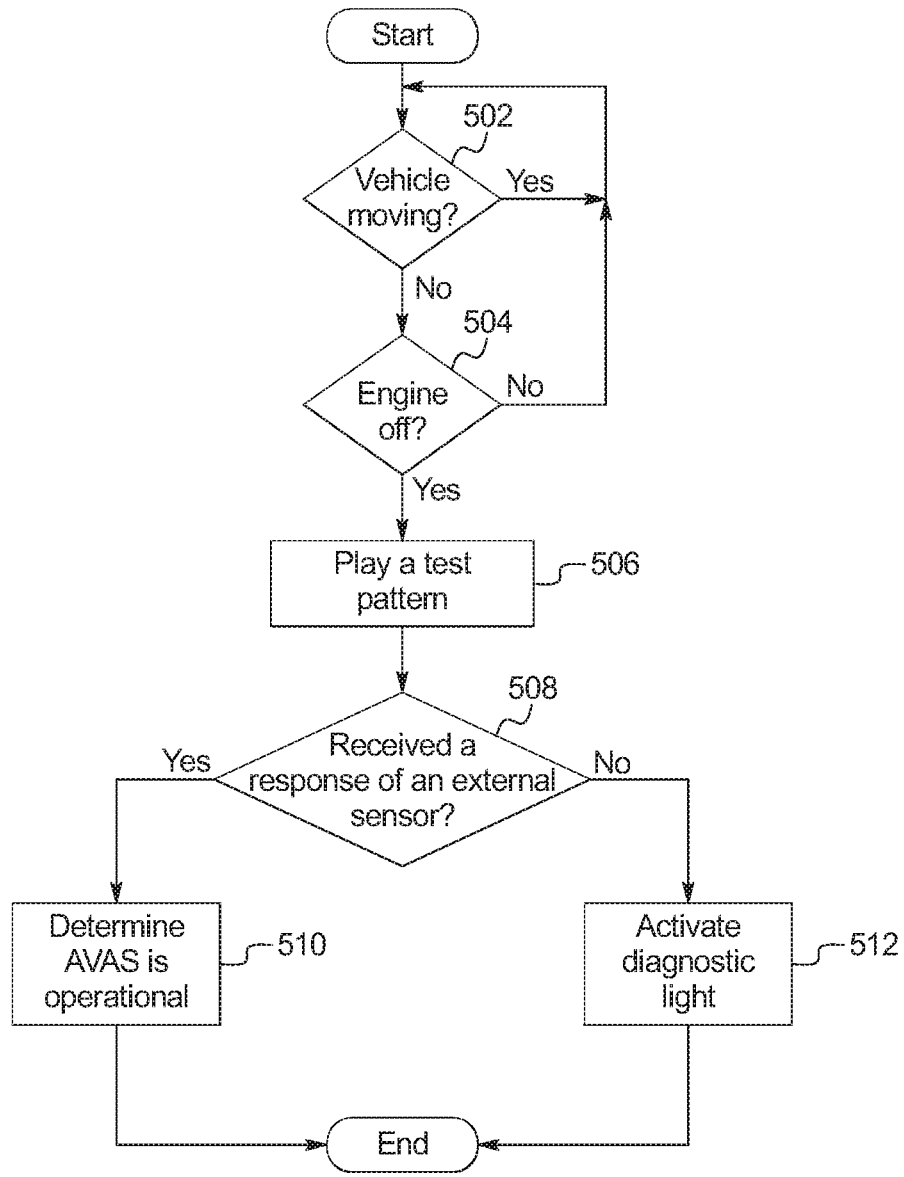
FIG. 5 is a flowchart of a method to diagnosis of the acoustic vehicle altering system of FIGS. 1 and 2 based on existing external sensors, which may be implemented by the electronic components of FIG. 2.

FIG. 5 is a flowchart of a method to diagnosis of the AVAS 106 of FIGS. 1 and 2 based on existing external sensors 116 and 122, which may be implemented by the electronic components 200 of FIG. 2. Initially, at block 502, the diagnostic module 120 waits until the vehicle 100 is not moving. In some examples, the diagnostic module 120 determines whether the vehicle 100 is moving based on information (e.g., vehicle speed, transmission setting, etc.) from the power train control module 202. At block 504, when the vehicle 100 is a hybrid vehicle, the diagnostic module 120 waits until the engine 108 is off. In some examples, the diagnostic module 120 receives or otherwise retrieves the state of the engine 108 from the power train control module 202.

At block 506, the diagnostic module 120 plays, via the speakers 112, a test pattern of sounds. At block 508, the diagnostic module 120 determines whether it received, via the DSRC module 110, a message acknowledging the sounds from the roadside unit 116 and/or the robot or drone 122. When the message acknowledging the sounds, the method continues at block 510. Otherwise, when the message does not acknowledge the sounds, the method continues at block 512. At block 510, the diagnostic module 120 determines that the AVAS 106 is functioning properly. At block 512, the diagnostic module 120 activates, via the center console display and/or the dashboard display, a diagnostic light.

Figure 6:
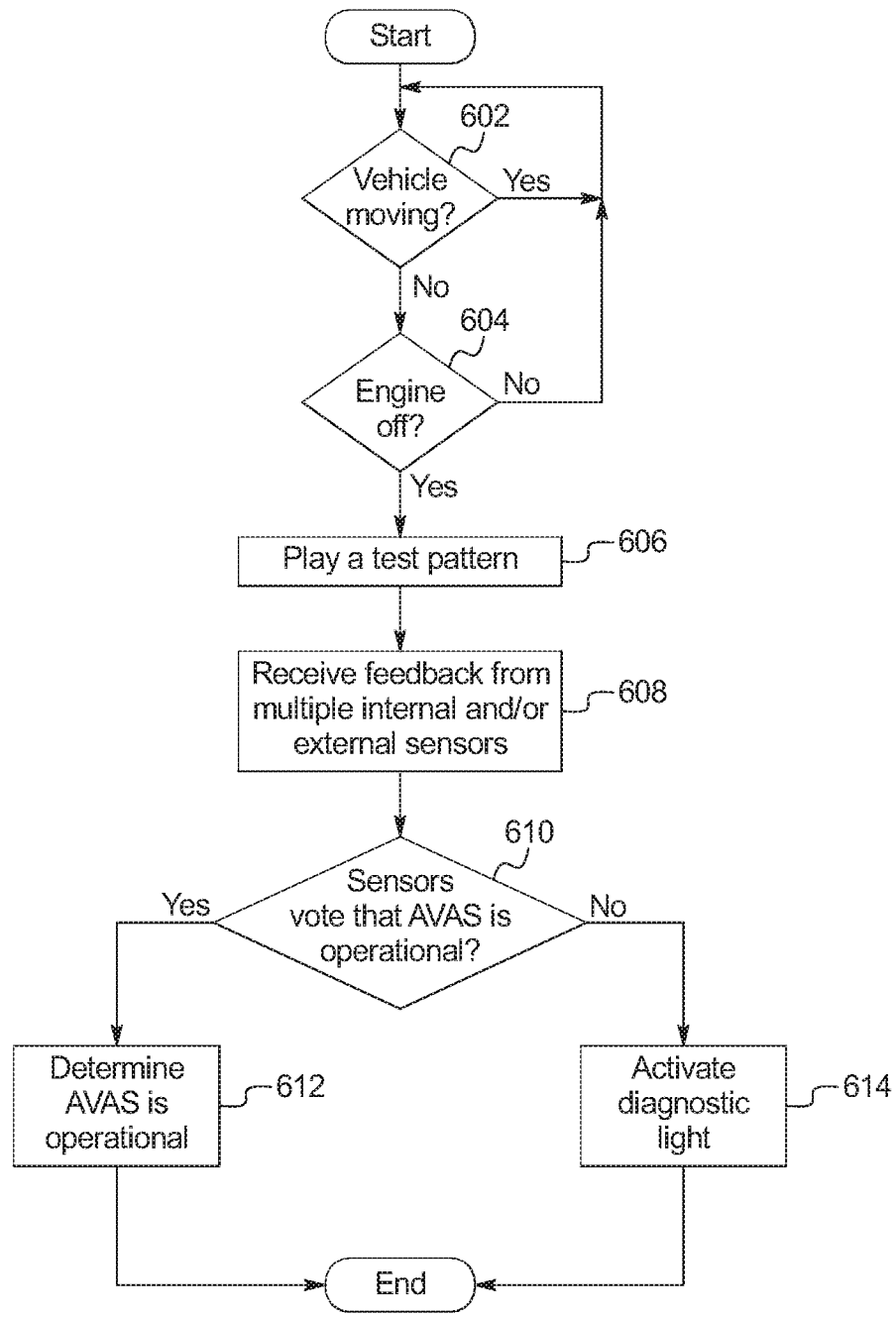
FIG. 6 is a flowchart of a method to vote and diagnosis of the acoustic vehicle altering system of FIGS. 1 and 2 based on existing internal and/or external vehicle sensors, which may be implemented by the electronic components of FIG. 2.

FIG. 6 is a flowchart of a method to vote and diagnosis of the AVAS 106 of FIGS. 1 and 2 based on existing internal and/or external vehicle sensors, which may be implemented by the electronic components of FIG. 2. Initially, at block 602, the diagnostic module 120 waits until the vehicle 100 is not moving. In some examples, the diagnostic module 120 determines whether the vehicle 100 is moving based on information (e.g., vehicle speed, transmission setting, etc.) from the power train control module 202. At block 604, when the vehicle 100 is a hybrid vehicle, the diagnostic module 120 waits until the engine 108 is off. In some examples, the diagnostic module 120 receives or otherwise retrieves the state of the engine 108 from the power train control module 202.

At block 606, the diagnostic module 120 plays, via the speakers 112, a test pattern of sounds. At block 608, the diagnostic module 120 receives feedback from multiple internal sensor (e.g., the engine knock sensor 102, the ultrasonic sensors 104, etc.) and/or multiple external sensors (e.g., the roadside unit 116, the robot or drone 122, etc.). At block 610, based on the feedback received at block 608, the diagnostic module 120 determines whether a majority of the feedback indicates that the AVAS 106 is functioning properly. When the majority of the feedback indicates that the AVAS 106 is functioning properly, the method continues at block 612. Otherwise, when the majority of the feedback indicates that the AVAS 106 is not functioning properly, the method continues at block 614. At block 612, the diagnostic module 120 determines that the AVAS 106 is functioning properly. At block 512, the diagnostic module 120 activates, via the center console display and/or the dashboard display, a diagnostic light.

The flowcharts of FIGS. 3, 4, 5, and 6 are representative of machine readable instructions stored in memory (such as the memory 210 of FIG. 2) that comprise one or more programs that, when executed by a processor (such as the processor 208 of FIG. 2), cause the AVAS 106 to implement the example diagnostic module 120 of FIGS. 1 and 2. Further, although the example program(s) is/are described with reference to the flowcharts illustrated in FIGS. 3, 4, 5, and 6, many other methods of implementing the example diagnostic module 120 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    speakers positioned to play sound to an area external to the vehicle;
    a sensor not part of an acoustic vehicle alerting system; and
    the acoustic vehicle alerting system including a processor configured to:
        play a test frequency on the speakers;

evaluate feedback from the sensor to determine whether there is an error in the acoustic vehicle alerting system; and when there is the error, display an alert, wherein the sensor is an engine knock sensor.

2. The vehicle of claim 1, wherein the test frequency is a natural frequency of an engine of the vehicle.

3. The vehicle of claim 1, wherein the processor is configured to wait until the vehicle is not in motion before playing the test frequency on the speakers.

4. The vehicle of claim 1, wherein to evaluate the feedback from the sensor, the processor is configured to compare a signal generated by the sensor to one or more thresholds.

5. The vehicle of claim 4, wherein the processor is configured to establish the thresholds based on a plurality of samples of the signal generated by the sensor.

6. The vehicle of claim 5, wherein the thresholds are based on a mean value of the plurality of samples and a standard deviation of the plurality of samples.

7. The vehicle of claim 1, wherein the processor is configured to:
determine when the error is correctable by increasing a gain of the speaker;
store the increased gain;
apply the increased gain when the speaker is activated in normal operation.

8. A vehicle comprising:
speakers positioned to play sound to an area external to the vehicle;
an ultrasonic sensor not part of an acoustic vehicle alerting system; and
the acoustic vehicle alerting system including a processor configured to:
play a test frequency on the speakers;
evaluate feedback from the sensor to determine whether there is an error in the acoustic vehicle alerting system; and
when there is the error, display an alert, wherein the sensor is an ultrasonic sensor.

9. A vehicle comprising:
speakers positioned to play sound to an area external to the vehicle;
a sensor not part of an acoustic vehicle alerting system;
the acoustic vehicle alerting system including a processor configured to:
play a test frequency on the speakers;
evaluate feedback from the sensor to determine whether there is an error in the acoustic vehicle alerting system; and
when there is the error, display an alert; and
a grille assembly with a fresh air opening with shutters that, when closed, block the fresh air opening to create a sound wall for sound generated by the speakers to reverberate against.

10. The vehicle of claim 9, wherein the processor is configured to close the shutters before playing the test frequency on the speakers.

11. A vehicle comprising:
speakers positioned to play sound to an area external to the vehicle;
sensors not part of an acoustic vehicle alerting system, wherein the sensors include an engine knock sensor and an ultrasonic sensor;
a dedicated short range communication module to communicate with an external object that has a microphone; and
the acoustic vehicle alerting system including a processor configured to:
play a test frequency on the speakers;
receive feedback from the sensors and the external object;
determine there is an error in the acoustic vehicle alerting system based on a majority of the feedback indicating that there is the error; and
when there is the error, activate a diagnostic light.

12. The vehicle of claim 11, wherein the external object is a roadside unit.

13. The vehicle of claim 11, wherein the external object is at least one of an unmanned ground vehicle or an unmanned aerial vehicle.

14. The vehicle of claim 11, wherein the feedback from the external object includes an indication of whether the test frequency is audible to the external object.

* * * * *